(12) United States Patent
MacKenzie

(10) Patent No.: US 8,578,273 B2
(45) Date of Patent: Nov. 5, 2013

(54) SLIDESHOW METHOD FOR DISPLAYING IMAGES ON A DISPLAY

(75) Inventor: Mark D. MacKenzie, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 671 days.

(21) Appl. No.: 11/927,979

(22) Filed: Oct. 30, 2007

(65) Prior Publication Data

US 2009/0113307 A1 Apr. 30, 2009

(51) Int. Cl.
*G06F 3/01* (2006.01)

(52) U.S. Cl.
USPC .......... 715/732; 715/730; 715/731; 715/835; 715/838

(58) Field of Classification Search
USPC ................................. 715/732, 838
See application file for complete search history.

(56) References Cited

U.S. PATENT DOCUMENTS

| | | | |
|---|---|---|---|
| 6,567,983 B1 | 5/2003 | Shiimori | |
| 6,738,075 B1 | 5/2004 | Torres et al. | |
| 6,791,530 B2 | 9/2004 | Vernier et al. | |
| 7,202,893 B2 | 4/2007 | Schick et al. | |
| 7,224,891 B1 | 5/2007 | Jam et al. | |
| 7,231,144 B2 | 6/2007 | Tanaka et al. | |
| 7,522,174 B2* | 4/2009 | Yamamoto et al. | 345/619 |
| 7,536,654 B2* | 5/2009 | Anthony et al. | 715/838 |
| 7,644,356 B2* | 1/2010 | Atkins et al. | 715/243 |
| 2002/0040375 A1* | 4/2002 | Simon et al. | 707/517 |
| 2002/0080180 A1* | 6/2002 | Mander et al. | 345/769 |
| 2003/0160814 A1 | 8/2003 | Brown | |
| 2004/0100487 A1* | 5/2004 | Mori et al. | 345/724 |
| 2004/0223747 A1 | 11/2004 | Otala et al. | |
| 2004/0261103 A1* | 12/2004 | Ohno et al. | 725/38 |
| 2005/0034077 A1 | 2/2005 | Jaeger | |
| 2005/0158037 A1 | 7/2005 | Okabayashi et al. | |
| 2005/0243381 A1 | 11/2005 | Hill et al. | |
| 2006/0026528 A1* | 2/2006 | Paulsen et al. | 715/776 |
| 2006/0026529 A1* | 2/2006 | Paulsen et al. | 715/776 |
| 2006/0071947 A1* | 4/2006 | Ubillos et al. | 345/648 |
| 2006/0115185 A1* | 6/2006 | Iida et al. | 382/305 |
| 2006/0150092 A1* | 7/2006 | Atkins | 715/517 |
| 2006/0200758 A1* | 9/2006 | Atkins | 715/517 |
| 2007/0074110 A1* | 3/2007 | Miksovsky et al. | 715/520 |
| 2008/0028341 A1* | 1/2008 | Szeliski et al. | 715/854 |
| 2009/0089660 A1* | 4/2009 | Atkins et al. | 715/243 |
| 2011/0145753 A1* | 6/2011 | Prakash | 715/783 |

OTHER PUBLICATIONS

Chen et al., "Audiovisual Slideshow: Present Your Journey by Photos," International Multimedia Conference Proceedings of the 14th Annual ACM International Conference on Multimedia, MM'06, Oct. 23-27, 2006, pp. 955-956 http://delivery.acm.org/10.1145/1190000/1180848/p955-chen.pdf? key1=1180848&key2=9653155811&coll=Portal&dl=GUIDE&CFID=25049750&CFTOKEN=64247505.

Chen et al., "Tiling Slideshow," International Multimedia Conference Proceedings of the 14th Annual ACM International Conference on Multimedia, Oct. 23-27, 2006, pp. 25-34 http://delivery.acm.org/10.1145/1190000/1180653/p25-chen.pdf? key1=1180653&key2=6723155811&coll=Portal&dl=GUIDE&CFID=25049750&CFTOKEN=64247505.

DVD Photo Slideshow User Manual, 21 pages, ANVSOFT INC. www.dvd-photo-slideshow.com/dps-user-manual.pdf.

* cited by examiner

*Primary Examiner* — Ramsey Refai
*Assistant Examiner* — Meseker Tekele
(74) *Attorney, Agent, or Firm* — Vierra Magen Marcus LLP

(57) ABSTRACT

A method and system are disclosed for presenting digital images over a display in a slideshow presentation. The slideshow has an appearance of the images being hand-placed and for providing a more human feel to the presentation of digital images.

11 Claims, 9 Drawing Sheets

SLIDESHOW METHOD FOR DISPLAYING IMAGES ON A DISPLAY

BACKGROUND

Providing users of computers with interesting and engaging tools for presenting content stored upon a computer has become increasingly important as the information stored in computing environments has grown and diversified. For example, millions of families now use digital cameras to snap hundreds of images each year. These images are often stored on a computer, and users rely on various computerized utilities to display and interact with their photos.

In order to present these photos and other digital images, a variety of user interfaces and presentation techniques are currently commercially available. For example, Windows® XP Media Center Edition includes a feature that presents images in a slideshow. To transition between digital images, this version of Windows® XP provides two options. The first is a transition without any effects. This presentation is very similar to a traditional, non-computerized slide projector; the images are simply presented one after another. The second option provides for a softer transition between the images. The first image slowly disappears as a second image is blended into view. Another commercially available slideshow is provided by Apple Corporation's iPhoto. iPhoto offers a set of pre-determined transition animations from which a user can choose the direction of movement and the speed of the transition from one image to another. After a user has dictated which effects are desired, the application presents a slideshow in accordance with the user's directions.

While these slideshows provide functional presentations of digital images, they include only predictable and preset presentations of the images. The uniformity with which images are presented, and the uniformity of the transition from one image to the next, creates a mechanized feel to the slideshow. There is therefore, a need to provide a more "human" feel and user experience for the presentation of digital images.

SUMMARY

Embodiments of the present system relate to a method for presenting digital images over a display with an appearance of the images being hand-placed and for providing a more human feel to the presentation of digital images. The present system generates low resolution thumbnail images from source images stored on a user's computing device. Then, for example during inactive periods of a user's computing device, the present system provides a slideshow presentation of the thumbnail images. In embodiments, all of the thumbnail images are resized relative to the source images from which they were generated so that each thumbnail image has the same height. The aspect ratio of the sources images may be maintained, so that the width of the various thumbnail images may vary.

Given the uniform height and varying width, the thumbnail images are displayed in the slideshow presentation mode in a brickwork fashion of rows of uniform height, but no discernable columns. Several features are provided to give the slideshow presentation the feel of hand placed images instead of images presented by a computer. For example, each image may have a horizontal, vertical and/or rotational skew which may be randomly selected for each image. Thus, the position of the thumbnail images together appears less uniform and more hand placed.

The slideshow presentation according to the present system automatically pans over the displayed images, and also zooms in and out. The path followed while panning and/or zooming is preferably not straight, but rather along an algorithmically determined gradual curve. This creates the impression of casual and haphazard floating between images, instead of a computerized feel of a straight line transition between images.

The slideshow presentation may pan over the images at a high elevation or pan over the images while zoomed in at a low elevation. When at the low elevation, the slideshow presentation may pan from one image to another image, pausing on each image to allow the image to be viewed and appreciated. Once a particular image is brought into focus, the source image is seamlessly opened and cross faded over the thumbnail image so as to bring the image "to life."

In a further aspect of the present system, an "in-place" slideshow may sporadically be shown. When displaying an in-place slideshow, a series of photos may be displayed sequentially, cross faded one over another, without moving the viewing perspective. The images displayed in the in-place slideshow may be related to each other so as to tell a pictorial story.

DETAILED DESCRIPTION

Figure 1:
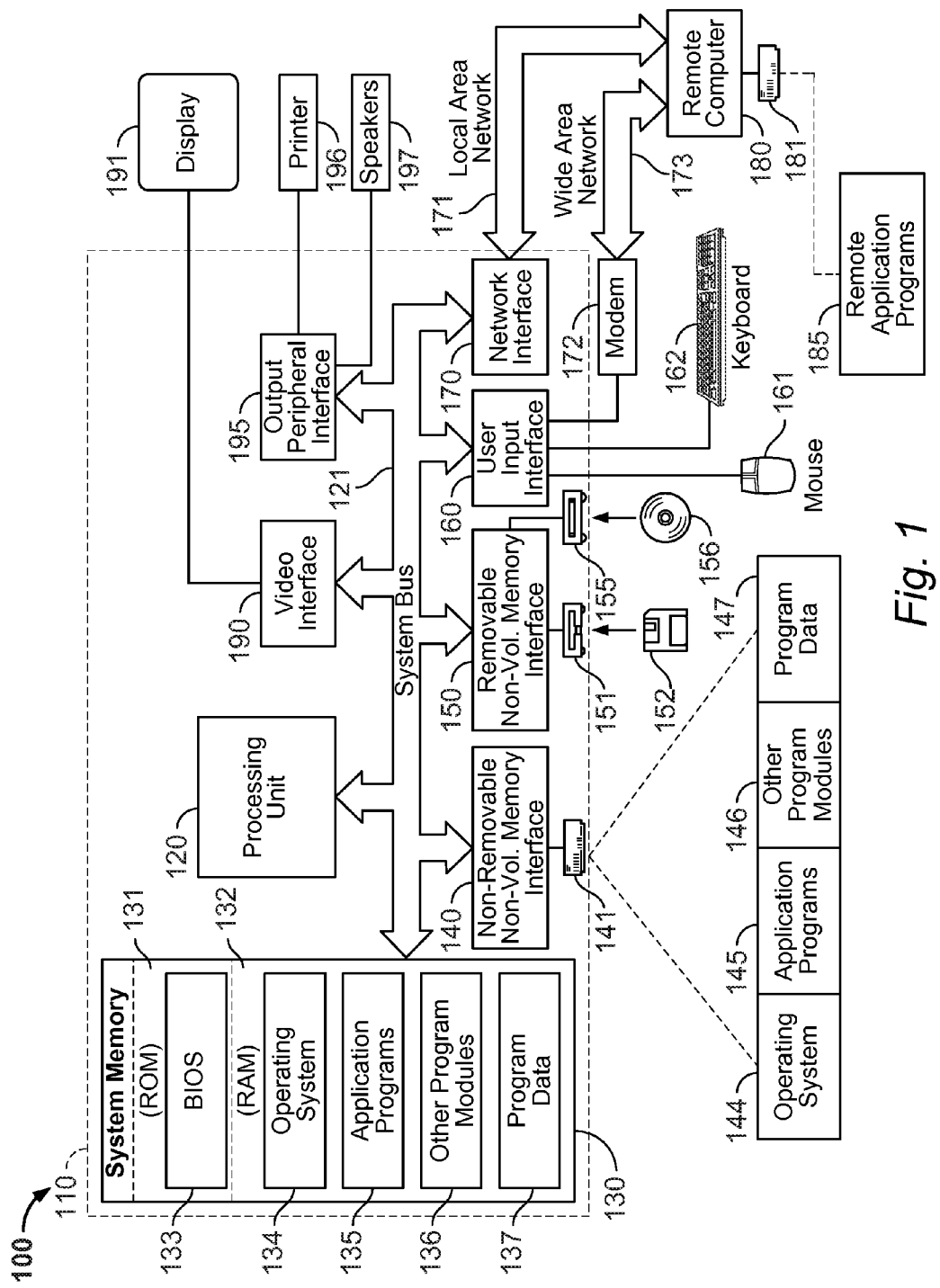
FIG. 1 is an exemplary functional block diagram of components of a computing environment for executing the present system.
Figure 2:
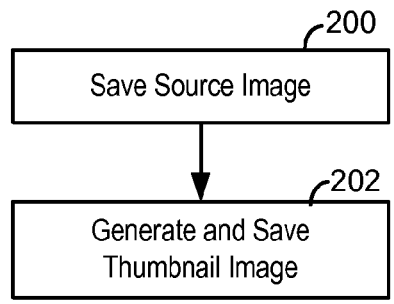
FIG. 2 is a flowchart for saving source and thumbnail images.

Embodiments of the invention will now be described with reference to FIGS. 1-11, which in general relate to slideshow methods for displaying digital photos on a display. The methods described herein can be performed on a variety of processing systems to display images on a monitor. The display monitor may be a CRT monitor associated with a computing environment as described in the following paragraphs. The display monitor may alternatively be a television set as also described below. FIG. 1 illustrates an example of a suitable general computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing systems, environments or configurations. Examples of well known computing systems, environments and/or configurations that may be suitable for use with the invention include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tapes, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. The application programs 135 may include a slideshow presentation application program according to the present system as explained hereinafter.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communication over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention will now be described with reference to the flowcharts of FIGS. 2-10 and the sample display screenshot of FIG. 11. Referring initially to the flowchart of FIG. 2, a source image will be saved to a user's computing environment in step 200. The format of the source image is not critical to the present system and may be any of a variety of known image formats such as jpeg, gif, bitmap, etc. Although not critical to the present invention, the user may optionally perform simple tasks such as rotation and/or cropping on the source images. The user may also set preferences for aspects such as image quality. Optionally, the user may also enter a graphic to appear beneath the image when displayed.

In step 202, either before, during or after saving the source image, the operating system or the slideshow presentation application program according to the present system may generate and save a thumbnail image associated with the source image. The thumbnail image may be a lower resolution copy of the source image. After the thumbnail image is created, it may be cached in memory. Thereafter, when the images are displayed as explained below, the cached thumbnail images may be used and a larger source image is only opened when specifically focused upon, as also explained below.

In embodiments, when generating the thumbnail image, the height of the image may be adjusted to a preset number of pixels, such as for example between 100 and 150 pixels, though it may be smaller or larger than that in alternative embodiments. Different source images will have different aspect ratios. In embodiments of the present system, the aspect ratio (width:height) of the source image is maintained in the thumbnail image. Thus, the height of the thumbnail images for all saved images may be set to the same number of pixels, but the widths of the saved thumbnail images will vary, depending on the aspect ratio of the different source images. When generating the thumbnail images, a color filter may be applied so as to generate the thumbnail images in black and white, regardless of the source image. In alternative embodiments, the thumbnail images may be saved in the same color scheme as the source images.

Figure 3:
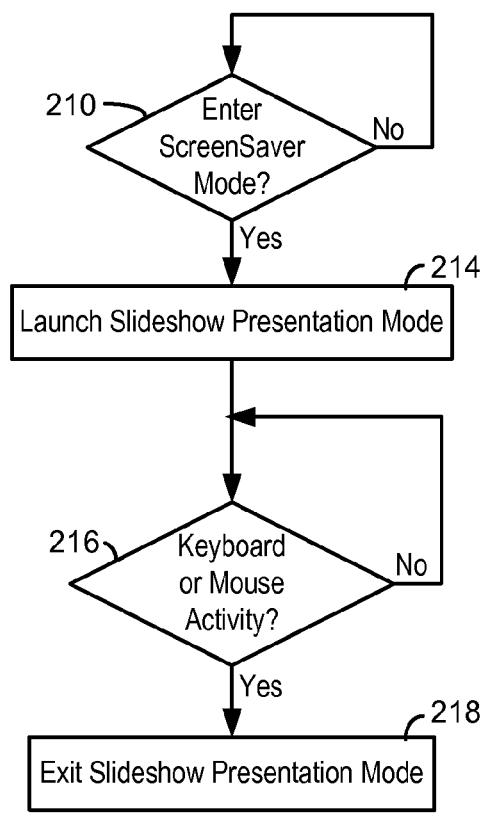
FIG. 3 is a high level flowchart of the launching and terminating of the slideshow presentation mode according to the present system.

Embodiments of the present system operate during idle periods of a user's computing environment as a screensaver to prevent a burn-in of an image on the display 191 of the computing environment 100. Referring now to FIG. 3, in step 210, the operating system may determine if a preset period of time has passed without user interaction with the computing environment. If the preset period of time has passed without interaction, the operating system may launch the slide presentation mode according to the present system explained below in step 214. The slide presentation mode according to the present system may continue until a keyboard, mouse or other interaction with the computing environment is detected in step 216. If such interaction is detected, the slideshow presentation mode may be terminated in step 218 and the display 191 may again display what was shown on the display prior to launching the slideshow presentation mode in step 210.

Figure 4:
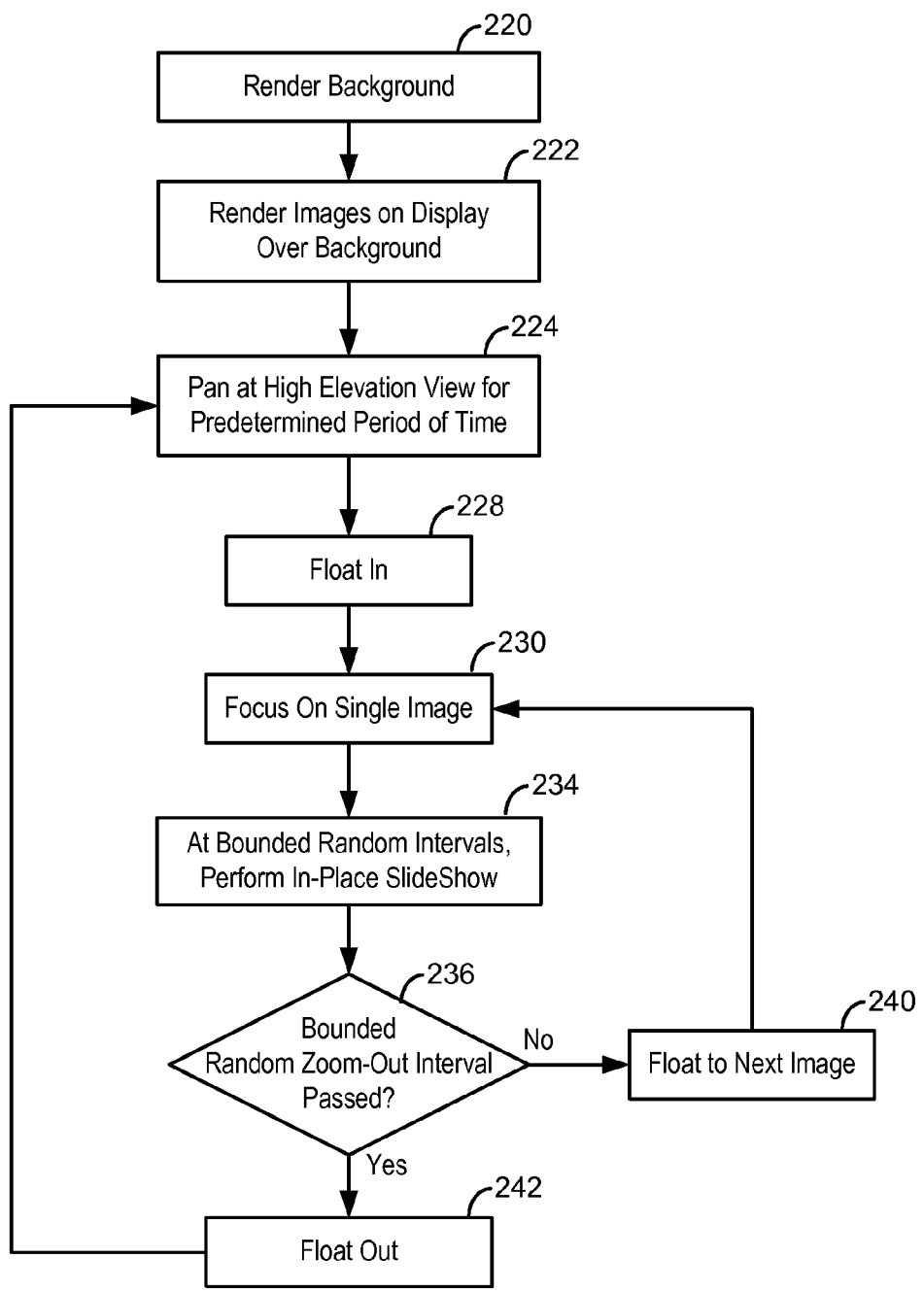
FIG. 4 is a flowchart of the operation of the slideshow presentation mode according to the present system.

Referring now to the flowchart of FIG. 4, there is shown a high level description of the operation of the slideshow presentation mode. Upon launch of the slideshow presentation mode in step 214 as described above, the software of the present system may first render a background on display in step 220. The background may be any color including white and black, or may alternatively be a pattern. In step 222, images are rendered on display 191 over the background. In embodiments, the present system may search one or more directories on the user's computing environment for all images saved as described above with respect to FIG. 2. Alternatively, a user may designate one or more directories on the user's computing environment from which images are taken for display in step 222.

Figure 5:
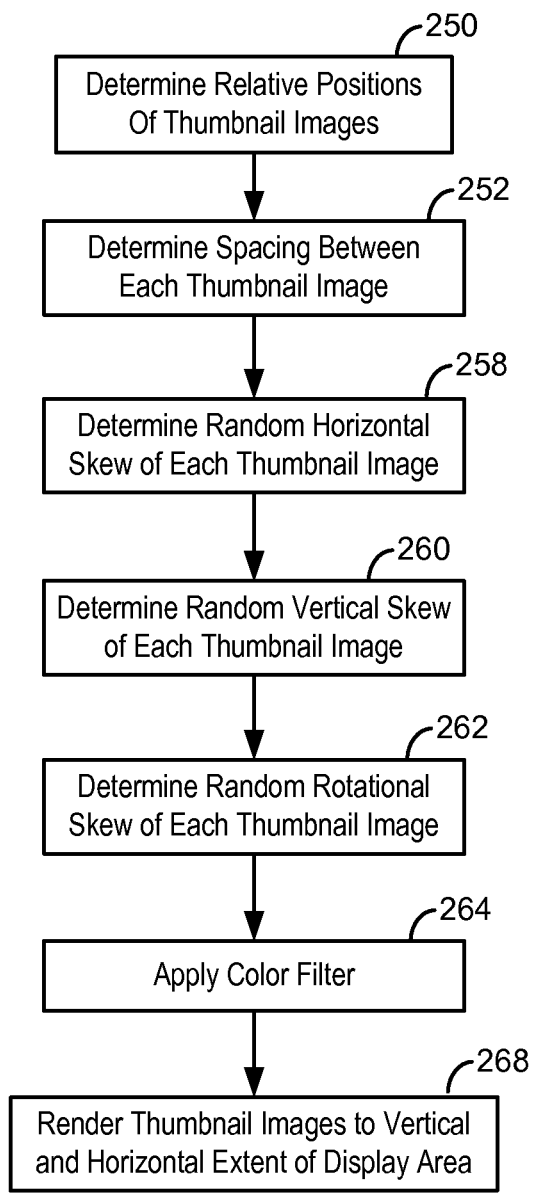
FIG. 5 is a flowchart of the steps involved in rendering images on the display.

The rendering of images in step 222 is explained in greater detail hereinafter with respect to the flowchart of FIG. 5. However, in embodiments, the images will be displayed in horizontal rows in a brickwork fashion, extending off of the left and right sides of the display and extending off of the top and bottom of the display. As explained hereinafter, the images may be moved together left, right, up and/or down so as to create the effect of a viewer or camera panning over the images. This viewpoint perspective from which the images are seen on the display is referred to hereinafter as a viewpoint of a virtual video camera panning over the images, and also zooming in toward and away from the images. Moving the images left, right, up or down to create the impression of panning over the images, and increasing and/or decreasing the size of the images to create the impression of zooming in and/or out, may be accomplished by known animation algorithms performed by a processor in processing unit 120 and/or a graphics card within the computing environment.

As the virtual camera pans in one direction, for example to the left on the display 191, images appear on the display from the left border of the display and images that were visible on the right side of the display disappear off of the right border of the display. Similarly, when panning right, images appear from the right side of the display and disappear to the left. Corresponding image motions take place when panning up and/or down. Thus, the impression is created of an endless brickwork of photos laid out in rows on the display such as for example shown in the screenshot of a display in FIG. 11. Although shown simply as boxes in FIG. 11, each of the boxes shown in FIG. 11 may be a thumbnail image 500, which can be a photo or a wide variety of other graphical images shown on display 191. Although not shown in FIG. 11, each of the graphical images 500 may be displayed with a border around the image added by a known algorithm. The border may be omitted in alternative embodiments.

As indicated, the heights of the thumbnail images are adjusted to all be the same height. Thus, the thumbnail images may be shown in rows. However, the aspect ratio of the original image is maintained so that the widths of all of the thumbnail images may differ. Thus, there are no uniform columns. Even where adjacent rows have thumbnail images of the same width, the slideshow presentation application program may detect this, and offset one row from the adjacent row so that there are no discernable columns. This offset feature may be omitted in alternative embodiments. It is understood that in further alternative embodiments, the widths of all thumbnail images may be controlled to be the same, but the height of the thumbnail images would vary to maintain the aspect ratio of the source image. In such embodiments, the thumbnail images may be laid out in columns, but not rows.

Figure 11:
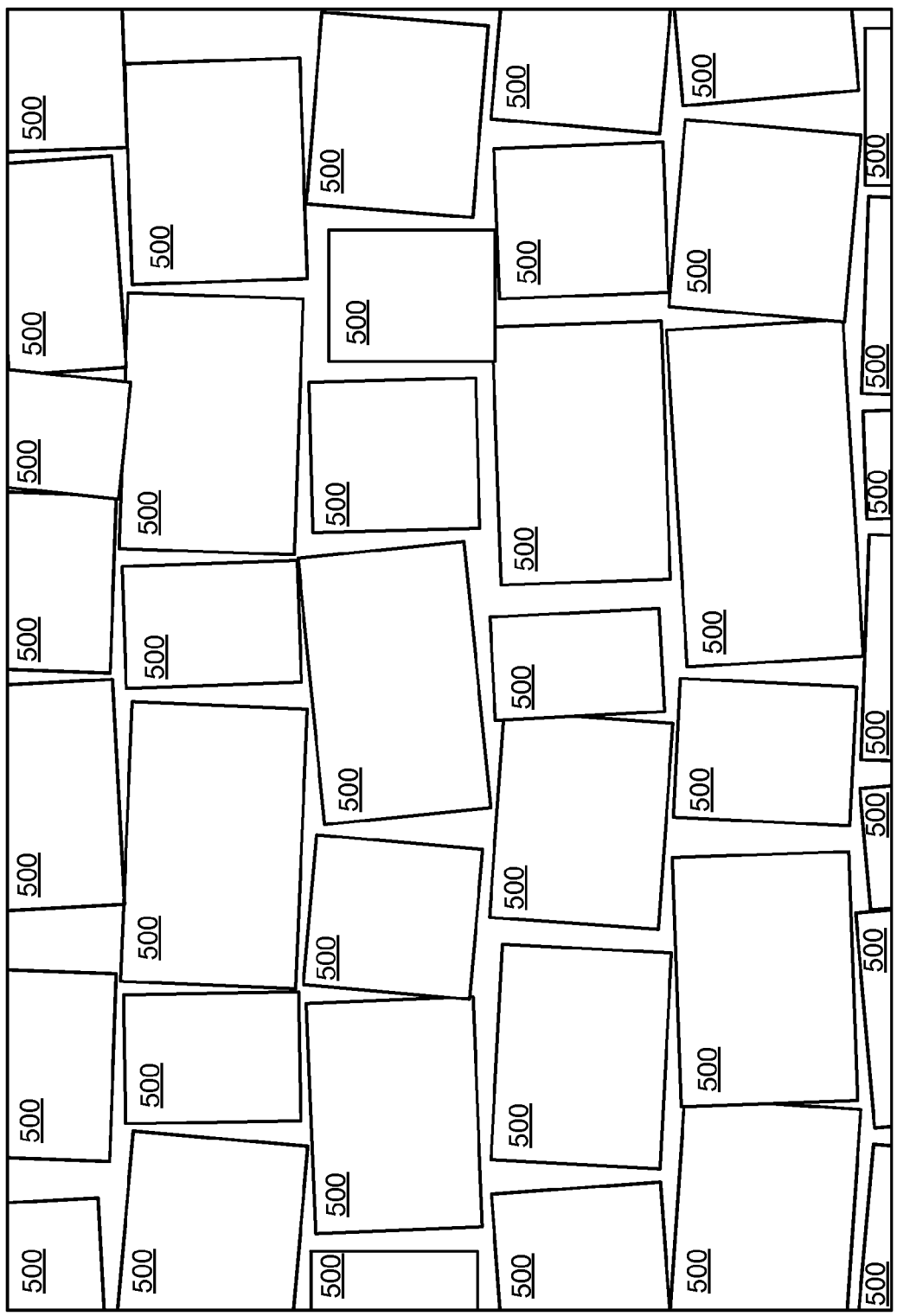
FIG. 11 is a screen shot of a plurality of thumbnail images shown on a display.

The initial display of the images, such as shown in FIG. 11, may be referred to as a "high elevation view." In embodiments, the high elevation view may display 50 to 100 images in five to eight rows across the display. In embodiments, each row can have a height of 100 to 150 pixels. It is understood that the number of images, the number of rows and the height of each row may vary in alternative embodiments of the present system. The slideshow presentation application program fills the screen to the edges with a brickwork of thumbnail images, regardless of the aspect ratio of the display 191.

When panning so that a new set of thumbnail images appear on the screen, an image in that set will appear at first partially on the screen, and then more and more until the entire image is displayed. This furthers the impression of panning over an endless brickwork of photos on the display. Images may be recycled in order to create the impression of an endless brickwork of photos. In particular, in an example of panning to the right, an image which has disappeared off the left side of the screen may reappear at the right side of the screen as the images move from right to left in the apparent pan. The rate at which photos need to be recycled will depend on the number of images used in the slide presentation, and the size with which the images are initially displayed on the display.

Once the images are rendered in step 222, the virtual camera may pan over the images at the high elevation view for a predetermined period of time in step 224. Step 224 is explained in greater detail below with respect to the flowchart of FIG. 6. In embodiments, that period of time may always be the same or it may vary. When variable, it may be set by a known randomization function. Moreover, the path followed by the virtual camera when panning may be a gentle curve or other non-straight path, which is determined algorithmically as explained hereinafter. This creates an impression of random, haphazard panning over the images at the high elevation.

In step 228, the virtual camera floats inward from the high elevation view to a low elevation view where the images are enlarged until a single image may take up substantially the entire display. Further details of step 228 are described hereinafter with respect to the flowchart of FIG. 7. The impression of floating inward may be created by zooming in while also panning left, right, up or down. As indicated, the panning and zooming effects may be accomplished by known animation algorithms.

In step 230, the camera may focus on a single image, which is centered in the display and has a height and/or width extending to the boundaries of the display. Further details with regard to focusing on a single image are described below with respect to the flowchart of FIG. 8. Different images may have different aspect ratios. Depending on the aspect ratio of the image and the aspect ratio of the display, the image may be displayed across the entire height of the display with the width of the image being shorter than the width of the display. In such an example, the background and/or portions of the images to the left and right of the centered image may be displayed. Alternatively, an image focused on in step 230 may have a wider aspect ratio than the screen, so that the image is displayed across the entire width of the display with the height of the image taking up less than all of the height of the display. In this example, the background and/or the images above and below the centered image may be displayed.

In one mode of operation, after focusing on a single image for a preset period of time in step 230, the virtual camera may pan to another image as explained hereinafter. However, in a second mode of operation an "in-place slideshow" may be displayed in step 234 over the single image focused on in step 230. Details of the in-place slideshow of step 234 are described hereinafter in greater detail with respect to the flowchart of FIG. 9, but in general, a series of photos may be displayed one after another in sequence directly over the image focused on in step 230. The photos displayed in the in-place slideshow may be related to each other so as to tell a pictorial story.

The in-place slideshow of step 234 may be displayed at regular intervals or at bounded random intervals. When random, the time between in-place slideshows may be selected using a known randomization function but may be bounded to occur within upper and lower time limits, for example no sooner than every five frames (focusing on five successive images) and no longer than every fifteen frames.

If it is not time to perform the in-place slideshow of step 234, the software application of the present system next checks to see whether a bounded random zoom-out interval has passed in step 236. In particular, the present system may stay at the low elevation view for a period of time or for a number of frames, which time or number of frames may be regular or determined randomly within bounded lower and upper limits. For example, the present system may stay zoomed at the low elevation view for one to two minutes. It is understood that the present system may stay at the low elevation view for less than one minute and greater than two minutes in alternative embodiments.

If it is determined in step 236 that the zoom interval has not yet elapsed, the present system performs a step 240 of floating to a next image. Further details relating to step 240 are described with respect to the flowchart of FIG. 9. However, in general, the camera pans while zoomed to low elevation view over an algorithmically determined path to another image. At that point, the slideshow presentation application program of the present system returns to step 230 to focus on the new image.

If on the other hand, the zoom interval has elapsed in step 236, the virtual camera floats outward in step 242 until the view of the display is once again at the high elevation view. Step 242 is in effect the reverse of step 228 described in greater detail with respect to the flowchart of FIG. 7. The slideshow application program according to the present system then returns to step 224 to once again pan at the high-level view for a predetermined period of time.

Further detail will now be given with respect to certain steps of the overall operation of the slideshow presentation mode shown in the flowchart of FIG. 4. Step 222 of FIG. 4 for rendering images on the display will now be explained in greater detail with respect to the flowchart of FIG. 5. In step 250, the application program may first determine the relative positions of each of the thumbnail images to be rendered on the display. This may be done using a randomization function so that related photos are not generally shown adjacent to each other. Related photos may be displayed adjacent to each other in alternative embodiments.

The slideshow presentation application program may determine the positions of all thumbnail images on the display in step 250. However, when panning in step 224, new images appear on the display. The positions of these newly appearing images may be determined at the same time and by the same process as the positions of the images initially appearing on the display. For example, a matrix of all stored thumbnail images may be determined, and a subset of those thumbnail images is initially shown on the display. If a boundary of the matrix of all images is reached, then thumbnail images from the opposite end of the matrix may next be displayed so that the matrix "wraps around" in all directions (in a figurative sphere). Thus, the virtual camera may pan over the images endlessly without reaching a border. Instead of initially determining the positions of all images, the positions of newly displayed images may be determined after determination of the positions of the images initially appearing on the display, using all available thumbnail images.

In step 252, the spacing between each thumbnail image is laid out. As indicated, the widths of the thumbnail images will vary. Preferably a constant spacing is initially provided between each thumbnail image in a row (which spacing is randomly skewed as explained below). A constant spacing is also initially provided between thumbnails in adjacent rows (which spacing is also randomly skewed as explained below). The background shows through in the spaces between adjacent thumbnail images.

In steps 258, 260 and 262, the slideshow presentation application program of the present system determines a random horizontal, vertical and rotational skew for each thumbnail image. In particular, while the precise position of each thumbnail image was determined in steps 250 and 252 described above, it is desirable in accordance with the present system to create the impression that the photos are hand placed on the display. Accordingly, after precise position of each image is determined, the horizontal, vertical and rotational position of each image is adjusted using a randomization function so that the position of the thumbnail images together appears less uniform and more hand placed as shown in FIG. 11.

The amount by which each image may be offset horizontally, vertically and/or rotationally with respect to its initially determined position may range from no horizontal, vertical and/or rotational offset to a maximum horizontal, vertical and/or rotational offset. For example, the maximum horizontal skew may be ±five to ten pixels, the maximum vertical skew may be ±five to ten pixels, and the maximum rotational skew may be ±five to ten degrees. It is understood that these maximum skews are by way of example only and the actual maximum skews may be greater or lesser than the ranges set forth above in alternative embodiments. Using the maximum skews and a minimum skew of zero adjustment, a known randomization function may be used to determine a random horizontal, vertical and rotational skew for each thumbnail image, thus creating the hand placed appearance on display 191 shown in FIG. 11.

In embodiments, regardless of the color of the source image stored in memory, the thumbnail images may be displayed in black and white. Accordingly, in step 264 either prior to or as the thumbnail images are rendered on the display, a color filter is applied so that each of the thumbnail images is displayed in black and white. As described above with respect to FIG. 2, when the thumbnail image is generated and saved in step 202, a color filter may be applied at that point so that the thumbnail images are saved in black and white. In such embodiments, step 264 may be omitted. Moreover, in further embodiments of the present system, the thumbnail images may be displayed in their native color scheme. In such embodiments, the step 264 of applying the color filter may be omitted.

Once steps 250 through 264 are completed, the thumbnail images may be rendered in step 268 to the vertical and horizontal extent of the display area as shown in FIG. 11. As described above, the display may pan left, right, up or down to create the impression of a continuous canvas of photo images. Accordingly, only portions of images may be displayed at the left, right, upper and lower borders of the display which portions are either removed from the display if the virtual camera pans further away from that image, or which portion turns into the complete thumbnail image if the virtual camera pans in the direction of that image.

In step 268, the images may be rendered according to a variety of rendering schemes. In one embodiment, the images may be rendered one at a time in rapid succession and in a random order until the images fill up the display. In such an embodiment, a known randomization function may be used to determine the order in which the images are to be displayed on display 191. In a further embodiment, the images may initially all be clustered together in an overlapping relation at a center of the display, and thereafter expand outward to their predetermined positions to thereby fill up the display. In a further embodiment, the images may sweep in from the left, right, top or bottom of the display until the images fill the display. In a still further embodiment, the images may simply be rendered all at once across the display. Each of the above embodiments for rendering the thumbnail images on display is a known animation effect achievable by a processor in the processing unit 120 and/or on a graphics card.

Figure 6:
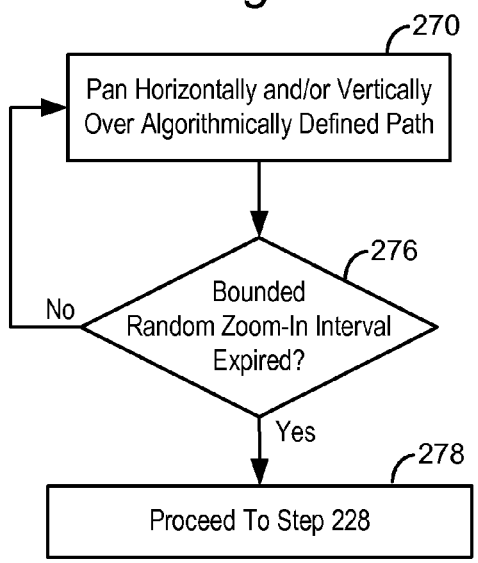
FIG. 6 is a flowchart of the steps involved in panning at the high elevation view.

Step 224 of panning at the high elevation view will now be described in greater detail with respect to FIG. 6. In step 270, each of the thumbnail images on the display are moved together horizontally and/or vertically, maintaining the same spacing between images. The amount which the images are moved is small enough that, given the refresh rate of the display of for example thirty times per second, the movements appear to be a smooth, continuous pan.

In embodiments, in order to create the impression of a leisurely, random and haphazard pan over the thumbnail images, the path followed by the virtual camera during the pan is preferably not a straight path. Instead, an algorithm may be used to define a path that follows a gentle curve or one or more gentle curves. Those of skill in the art will understand equations which may be employed to define a pan path that follows one or more gentle curves.

In embodiments, the start point (current position) of the virtual camera is known, and an end point may be selected randomly within some defined bound (such as for example within a one to five image radius of the current position. Given these start and end positions, one or more equations may be employed to define the pan path of the virtual camera over the images. Preferably, the equation(s) may include variables selected at random by a known randomization function, so that the path of travel of the virtual camera will be different from one pan to the next. The panning equations may include further constraints to prevent abrupt or a complete reversal of panning motion, though these constraints need not be employed in alternative embodiments.

In embodiments, in addition to panning horizontally and/or vertically over the displayed images in step 270, the size of the images may be slightly increased or decreased, while maintaining the same proportional spacing between the images, so as to create the impression of a slight zoom in and zoom out. Thus, in addition to panning horizontally and/or vertically in a gentle curve over the images, there is also the impression of gently floating closer to and/or further from the thumbnail images as the virtual camera pans over the display. This further enhances the floating effect. It is understood that the above-described process of zooming closer to and further from the images may be omitted from step 270 in alternative embodiments. In such embodiments, the present system simply employs the horizontal and/or vertical pan over the algorithmically defined path over the images in step 270.

In step 276, the application program determines whether a bounded random zoom-in interval has expired. In particular, at some point, step 224 (FIG. 4) of panning around at the high elevation view will end and the step 228 of moving from the high elevation view to the low elevation view will be performed. In embodiments, the length of time at which the virtual camera pans at the high elevation view before floating in may be a constant set value or may be determined by a randomization function having an upper and lower bound. For example, the virtual camera may float at the high elevation view for between ten to thirty seconds before floating into the low elevation view. It is understood that the period of time may be shorter than ten seconds and longer than thirty seconds in alternative embodiments of the present system.

In step 276, the present system checks whether the zoom-in interval has expired. If not, the slideshow presentation application program returns to step 270 to continue panning at the high elevation view. If, in step 276, it is determined that the zoom-in interval has expired, the application program proceeds to step 228 to float into the low elevation view.

Figure 7:
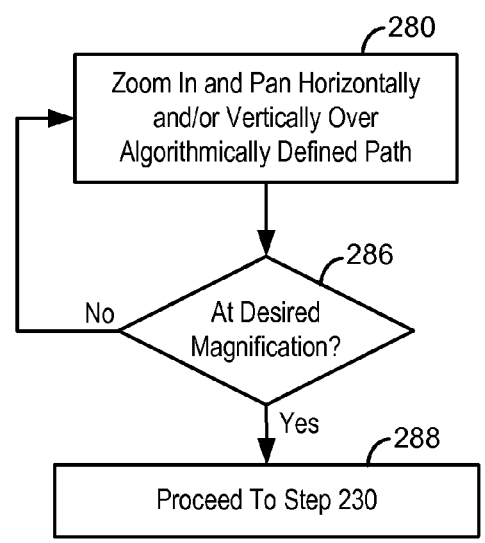
FIG. 7 is a flowchart of the steps involved in zooming into the low elevation view.

Step 228 of floating from the high elevation view to the low elevation view is described in greater detail with respect to the flowchart of FIG. 7. Step 280 may be similar to step 270 of FIG. 6, except that, in addition to panning, the step 280 includes a pronounced zoom-in from the high elevation view to the low elevation view. The same mathematical algorithms described above in step 270 may be used in step 280. In step 286, the application program determines whether the view has zoomed into the desired magnification. In embodiments, the virtual camera may continue to zoom inward until approximately a single thumbnail image fits on the display with a predefined minimum margin around the top/bottom or sides. It is understood that the virtual camera may zoom inward to a higher elevation than this, so that more than one thumbnail image fits on the display at the low elevation view.

If, in step 286, the slideshow presentation application program determines that the display is not at the desired magnification, the application program returns to step 280 and continues to pan over and zoom closer to the displayed images. If, on the other hand, it is determined in step 286 that the display is at the desired magnification, the present application proceeds to step 230 (FIG. 4) of focusing on a single image.

Figure 8:
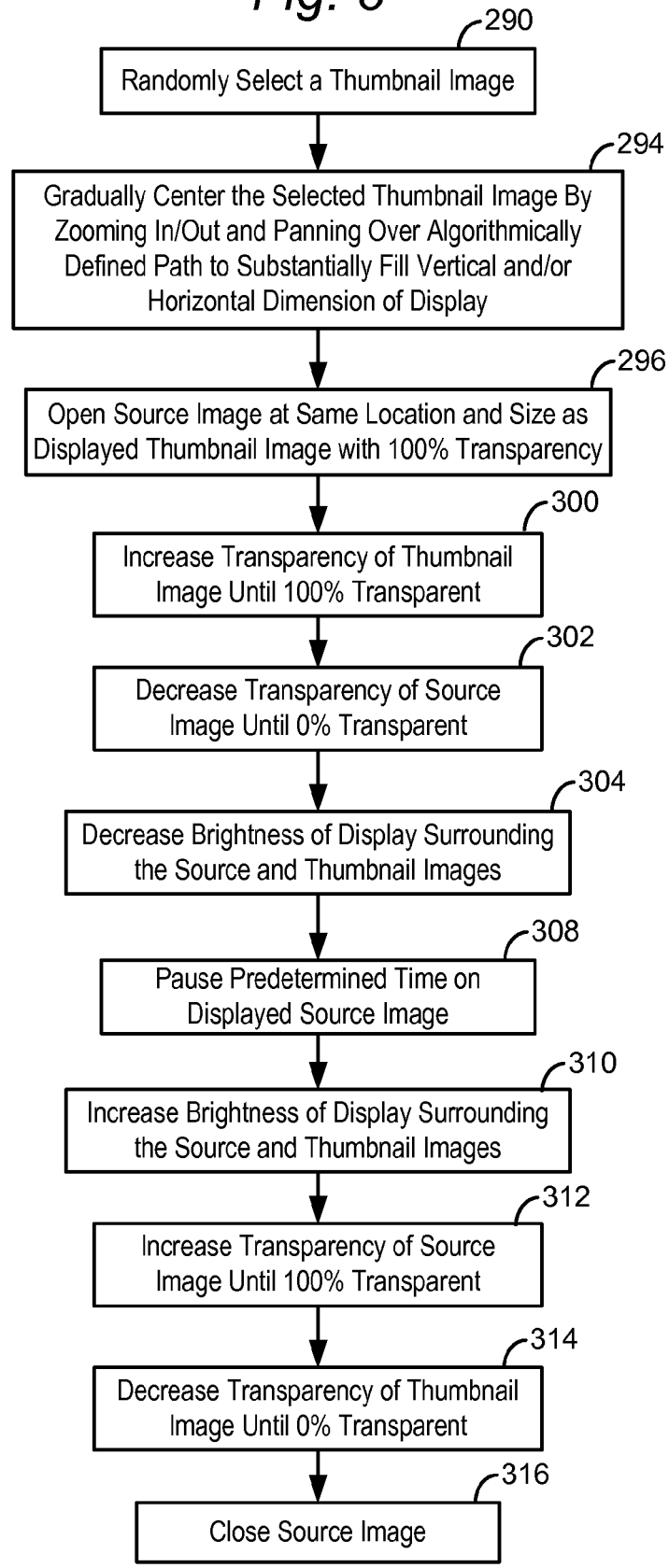
FIG. 8 is a flowchart of the steps involved in focusing on a particular image.
Figure 9:
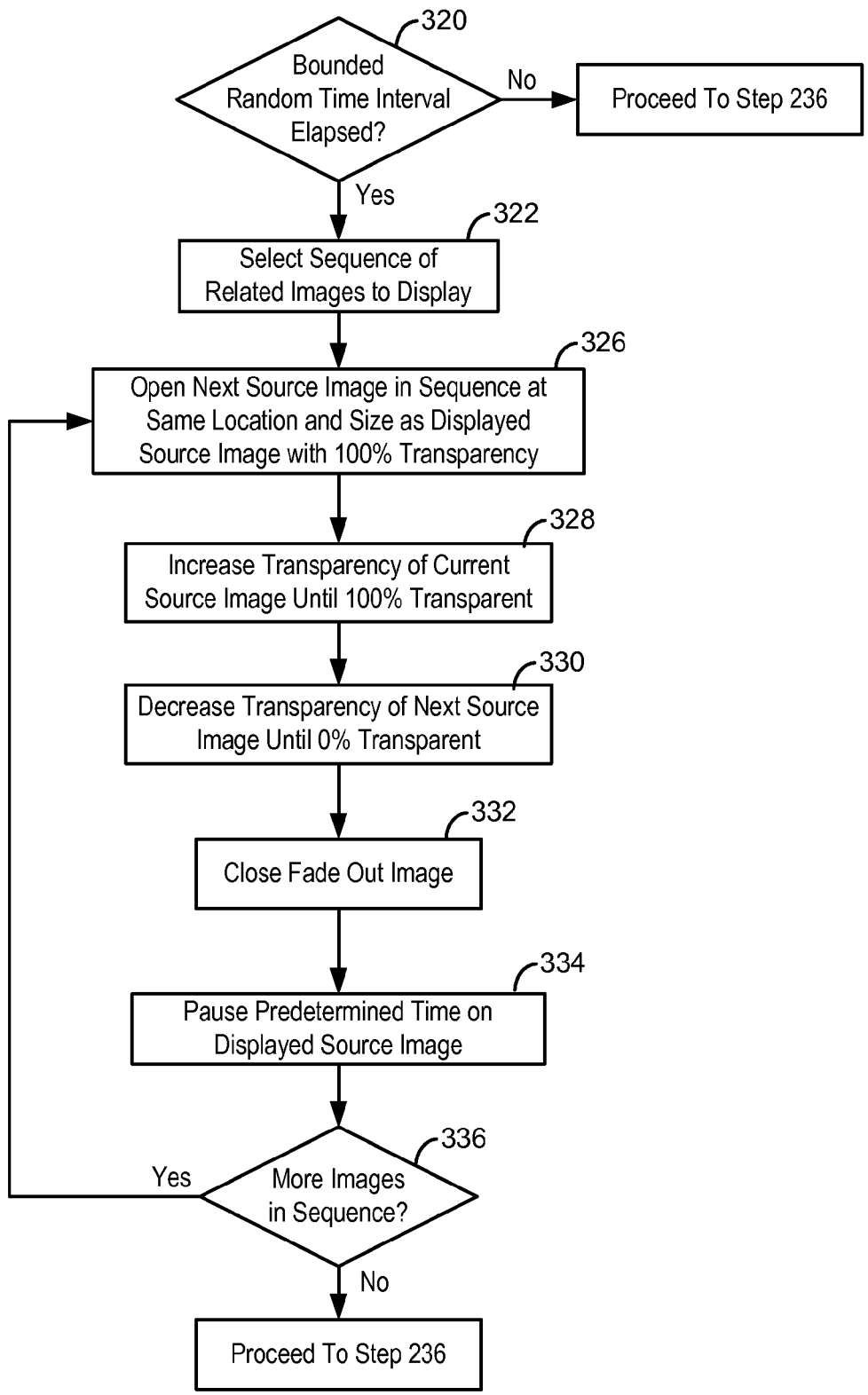
FIG. 9 is a flowchart of the steps involved in presenting an in-place slideshow.

Step 230 of focusing on a single image will be described in greater detail with respect to the flowchart of FIG. 8. In step 290, a thumbnail image may be selected at random. This may be the endpoint used in the equations for panning between a current position and an endpoint. Alternatively, after the virtual camera has floated into the low elevation view in step 228, a thumbnail image may then be selected at random in step 290. The thumbnail image selected in step 290 may preferably be within one to five thumbnail images of the thumbnail images displayed after floating into the low elevation view in step 228.

Once a thumbnail image is selected, the virtual camera may gradually center the selected thumbnail image on the display in step 294. The movement of the selected thumbnail image to the center of the screen may occur by moving the thumbnail image vertically and/or horizontally over an algorithmically defined path in a similar manner to that described above with respect to steps 270 and 280 of FIGS. 6 and 7. Additionally, the size of the selected image is increased, or possibly decreased, so that there is no more than a border of predefined size around two of the opposed edges of the selected image. The size of the border may vary, but may be an inch to two inches in embodiments.

As it is possible and even likely that the aspect ratio of the selected thumbnail image will not match the aspect ratio of the display, there will likely be a greater space around two of the opposed edges. In particular, if the height to width ratio of the selected thumbnail image is greater than the height to width ratio of the display, there will be a greater space to the left and right of the selected thumbnail image than above and below the image. Conversely, if the height to width ratio of the selected thumbnail image is smaller than the height to width ratio of the display, there will be a greater space above and below the selected thumbnail image than to the sides of the image. In either event, portions of the images to the sides, above and below the selected thumbnail image may also be displayed in the margins around the selected image.

In step 296, the source image corresponding to the selected thumbnail image may be opened at the same location and same size as the displayed thumbnail image. The source image may be displayed with one hundred percent transparency (i.e., not visible) and superimposed over a thumbnail image. In step 300, as the display refreshes, the transparency of the selected thumbnail image may be increased over a predefined period of time until it is one hundred percent transparent. In embodiments, it may take one to three seconds for the thumbnail image to fade to invisible. It is understood that this time period may be shorter or longer in alternative embodiments. Concurrently, in step 302, the transparency of the superimposed source image is decreased over a predetermined period of time until the source image is zero percent transparent and is completely visible. This period of time may for example be one to three seconds, but it may be longer or shorter in alternative embodiments. The fading of the thumbnail image in step 300 and appearance of the source image in step 302 may together be referred to as cross fading of the respective images. The net effect of the cross fade in steps 300 and 302 is to gradually make the low resolution, black and white thumbnail image invisible while making the high resolution original color source image completely visible, in effect bringing the image "to life." As the source and thumbnail image are superimposed over each other, this transition is seamless.

While the cross fade of steps 300 and 302 is taking place, the brightness of the display surrounding the source and thumbnail images may be decreased in step 304. This may include dimming the brightness of the background and/or any portions of adjacent images visible above and below the centered image or at the sides of the centered image. This further emphasizes the centered image.

In step 308, the source image may be displayed for a predetermined period of time such as for example two to five seconds. It is understood that the length of time which the source image is displayed in step 308 may be greater than or lesser than that range in alternative embodiments. Upon passing of the predetermined period of time in step 308, the brightness of the display surrounding the source image may be increased in step 310. In steps 312 and 314, the reverse cross fade may occur so that the source image fade to invisible and the thumbnail image is once again displayed. In step 316, the source image may be closed.

Referring again to FIG. 4, at this point, the slideshow presentation application program may pan to a new image, float outward to the high elevation view or may perform an in-place slideshow to display additional images over the thumbnail image then currently centered on the display. Further details of step 234 relating to performing an in place slideshow are now explained in greater detail with respect to the flowchart of FIG. 9.

The in-place slideshow is in effect a slideshow within a slideshow. In particular, while focused on a particular image of the slideshow, a sequence of one or more additional images may be superimposed over each other without changing the viewing perspective. As explained in greater detail below, the one or more images in the sequence are preferably related to each other so that the images together provide a pictorial story of a given event or a series of events.

The in-place slideshow may be displayed at bounded random time intervals. For example, the in-place slideshow may be displayed every minute to every five minutes. This time period may be determined by a randomization function as described in step 320, or the step may be performed upon passage of a constant preset time period. In step 320, the slideshow presentation application program determines whether this bounded random time interval has elapsed. If not, the application program does not perform the in-place slideshow, and proceeds to step 236. Alternatively, if in step 320 it is determined that the time interval has elapsed, the application program selects a sequence of images relating to the image then displayed.

Stored images may be determined to be related to each other, so as to be displayed together in an in-place slideshow, by a variety of methods. In one embodiment, the application program may select as being related images stored together within the same directory or subdirectory on the user's computing environment. Alternatively, the application program may select as being related those images which have the same or similar timestamp. Thus, the in-place slideshow would present images created at approximately the same time. As a further alternative, the application program may select as being related those images having a timestamp indicating they were taken at the same time period but in successive years. Thus for example, the present system may select images taken in late December so as to display in the in-place slideshow holiday and New Year's events from different years. In embodiments, a user may designate how the present system is to determine what images are related to each other for purposes of the in-place slideshow.

In step 326, the next source image in the selected sequence is opened at the same location and with for example the same height as the image currently being displayed. The next source image is opened with one hundred percent transparency so as not to be visible. In steps 328 and 330, the current image and next source image are cross faded. In step 332, if not already closed, the faded out image may be closed.

The slideshow presentation application program may pause for a predetermined period of time on the displayed source image in step 334, and then in step 336 may determine whether there are more images in the sequence of related images. If so, the application program returns to step 326 to open the next source image in the sequence and cross fades that source image over the then displayed image as described in steps 328 and 330. Alternatively, if in step 336 it is determined that there are no further images within the sequence of related images, the in-place slideshow ends and the application program proceeds to step 236.

Referring again to FIG. 4, in step 236, the application program determines whether a bounded random zoom-out interval has passed. In particular, the application program will stay at the low elevation view for a predetermined period of time or for a random period of time having an upper and lower bound. Step 236 determines if this period of time has elapsed. If not, the application program floats to the next image in step 240.

Figure 10:
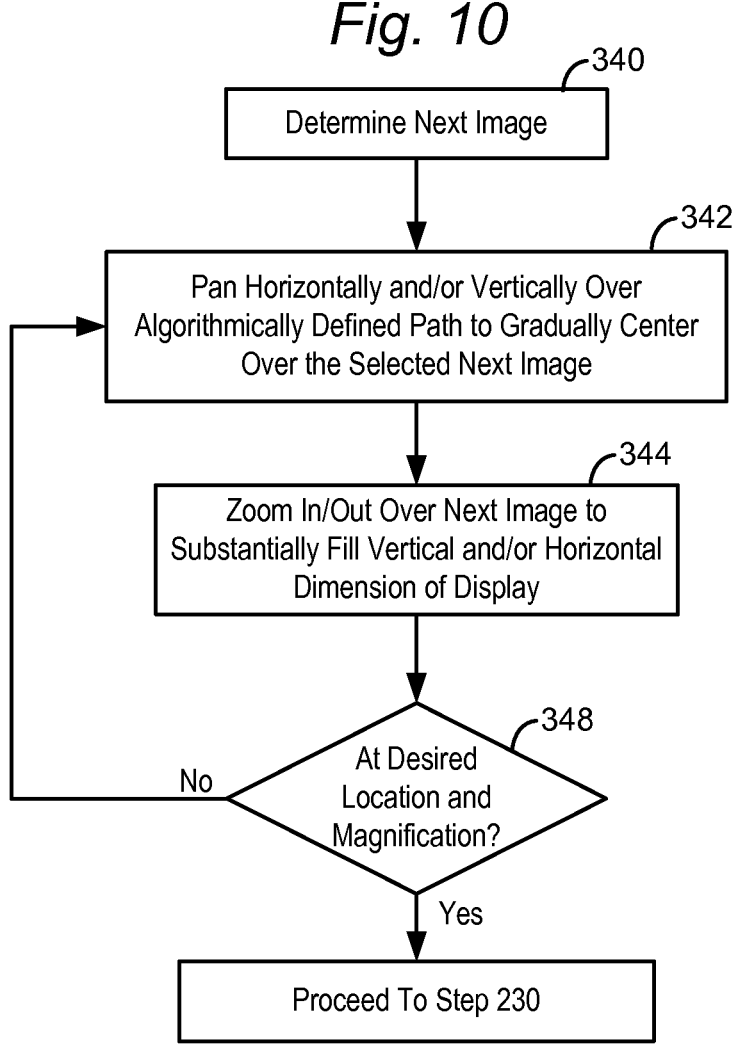
FIG. 10 is a flowchart of the steps involved in panning from a first image to a second image at the low elevation view.

Step 240 of FIG. 4 is explained in greater detail now with respect to the flowchart of FIG. 10. In step 340, the slideshow presentation application program determines the next image on which to focus. This image may be within a predetermined distance of the location of the currently displayed image. For example, the next image may be within a one to five image radius of the currently displayed image. In embodiments, the next selected image may in part or in whole be determined by the path followed to arrive at the current image. That is, the panning from one image to the next image and so on may occur over paths continuing in the same general direction. In alternative embodiments, the next image may be selected independently of the path followed to arrive at the current image.

Once the next image is determined, the virtual camera floats to the next selected image by panning and, in embodiments, zooming slightly in and/or out. The virtual camera may pan using the above-described algorithms to follow a gently curving path, seemingly selecting the next image at random.

The virtual camera may need to zoom in or zoom out to fit the next selected image in the display. In step 344, the size of the display may be gradually increased or decreased so that upon arriving at the next image it is displayed with a maximum margin around either the vertical and/or horizontal dimension of the display.

At 348, the slideshow presentation application program determines whether the next selected image is centered within the display and is the right size. If not, the application program repeats steps 342 through 346. If, on the other hand, it is determined in step 348 that the next image is centered on the display and it is the right size, the application again performs step 230 (FIG. 4) of focusing on a single image.

The slideshow mode described with respect to FIG. 4 and the detailed flowcharts of FIGS. 5 through 10 may be performed without any user activity or intervention. As indicated by FIG. 3, the slideshow presentation mode of FIG. 4 may be automatically launched as a screensaver upon lapse of a predetermined period of time without user interaction with the computing environment keyboard or mouse. Moreover, if at any time during the performance of the steps 220 through 242 of FIG. 4, the operating system detects a keyboard stroke for mouse activity, the slideshow presentation may automatically terminate.

In an alternative embodiment, instead of automatically launching as a screensaver, it is understood that the slideshow presentation mode may be affirmatively launched by a user, for example by a user selecting an icon which launches the slideshow presentation mode. Moreover, whether used as a screensaver or affirmatively launched by a user, it is understood that a user may interact with the application program of the present system using a keyboard and/or mouse. In this alternative embodiment, a keyboard stroke and/or actuation of the mouse will not automatically terminate the slideshow presentation mode, but rather, a user would have to affirmatively close the slideshow presentation mode, as by selecting a button on a screen which closes the slideshow presentation mode.

In embodiments where a user can interact with the slideshow presentation application program of the present invention, a user may control the pan at either the high elevation view or low elevation view using for example the arrow keys on the keyboard. A user may also select a particular image using the keyboard and/or mouse on which to focus.

In embodiments described above, the monitor may be a CRT display associated with a computing device. However, it is understood that the display 191 for displaying the slideshow images described above may be other types of displays in further embodiments. For example, the monitor 191 can be a television set. Details of displaying images over a television set are described in general in U.S. Pat. No. 7,202,893 to Schick, et al., entitled "Method and apparatus for the display of still images from image files," assigned to the owner of the present invention and incorporated by reference herein in its entirety. In an embodiment using a television as a monitor, a remote control may be used to interact with the monitor.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

I claim:

1. A method of presenting a slideshow over a display, comprising the steps of:
   (a) generating thumbnail images from a plurality of source images, including the step of resizing a height of the plurality of source images to a constant height in the thumbnail images and maintaining an aspect ratio of each source image in the thumbnail images, the source images having a higher resolution than a corresponding thumbnail image;
   (b) plotting a position for thumbnail images on the display in a brickwork pattern including a plurality of even rows and uneven columns;
   (c) skewing one or more of a horizontal, vertical and/or rotational position of one or more thumbnail images positioned in said step (b);
   (d) rendering the thumbnail images on the display;
   (e) automatically determining a curved or irregular path over which panning of the thumbnail images is to be performed;
   (f) panning over the thumbnail images in the curved or irregular path determined in said step (e);
   (g) pausing over and zooming in on a thumbnail image during said step (f) of panning over the thumbnail images, said step (g) including the steps of opening the source image from which the thumbnail image was generated, superimposing the higher resolution source image over the thumbnail image prior to zooming in on the image, and cross fading the source and thumbnail images; and
   (h) periodically presenting an in-place slideshow including the step of cross fading a plurality of related images while positioned at a constant viewing perspective.

2. A method as recited in claim 1, further comprising the step of zooming in closer to the thumbnail images and zooming out farther away from the thumbnail images.

3. A method as recited in claim 2, wherein said step (f) of panning over the thumbnail images comprises the step of panning over a plurality of thumbnail images while zoomed out, and panning from image to image while zoomed in.

4. A method as recited in claim 1, wherein the step (g) of pausing over and zooming in on a thumbnail image comprises the step of pausing over an image for a randomly selected period of time.

5. A method as recited in claim 1, wherein said step (g) of opening the source image, superimposing the source image over the thumbnail image, and cross fading the source and thumbnail images occurs seamlessly.

6. A method as recited in claim 1, further comprising the step (j) of displaying the thumbnail image in black and white and displaying the source image in color.

7. A method as recited in claim 1, further comprising the step (k) of adding images to the display and removing images from the display during said step (f) of panning over the thumbnail images.

8. A method as recited in claim 1, further comprising the step (m) of presenting an in-place slideshow including the step of cross fading a plurality of images while positioned at constant viewing perspective.

9. A method as recited in claim 1, wherein said step (f) of panning over the thumbnail images further comprises a slight zoom in and/or zoom out.

10. A method as recited in claim 1, wherein steps (d) and (f) occur automatically after passage of a period of inactivity of predefined length.

11. A method as recited in claim 1, wherein images may be recycled during said step (f) of panning to provide an appearance of unlimited images.

* * * * *